(12) United States Patent
Lessner et al.

(10) Patent No.: US 6,548,324 B2
(45) Date of Patent: Apr. 15, 2003

(54) EDGE FORMATION PROCESS WITHOUT ANODIZING FOR ALUMINUM SOLID ELECTROLYTIC CAPACITOR

(75) Inventors: Philip Michael Lessner, Simpsonville, SC (US); Albert Kennedy Harrington, Mauldin, SC (US); Brian John Melody, Greer, SC (US); John Tony Kinard, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 58 days.

(21) Appl. No.: 09/874,388

(22) Filed: Jun. 6, 2001

(65) Prior Publication Data
US 2002/0191371 A1 Dec. 19, 2002

(51) Int. Cl.$^7$ .............................. H01L 51/40
(52) U.S. Cl. .............. 438/99; 438/396; 438/399; 438/523; 361/508; 361/523; 361/528
(58) Field of Search .............. 438/99, 396, 399, 438/523; 361/523, 528, 508

(56) References Cited

U.S. PATENT DOCUMENTS

| | | |
|---|---|---|
| 3,796,644 A | 3/1974 | Bernard |
| 4,113,579 A | 9/1978 | Randall, Jr. et al. |
| 4,159,927 A | 7/1979 | Bernard et al. |
| 4,481,084 A | 11/1984 | Chen et al. |
| 4,537,665 A | 8/1985 | Nguyen et al. |
| 4,715,936 A | 12/1987 | Florio |
| 5,078,845 A | 1/1992 | Kunugihara et al. |
| 6,307,735 B1 * | 10/2001 | Saito et al. .............. 361/517 |
| 6,344,966 B1 * | 2/2002 | Monden et al. .............. 361/524 |
| 6,375,688 B1 * | 4/2002 | Akami et al. .............. 29/25.03 |

FOREIGN PATENT DOCUMENTS

EP    1 028 441 A1    8/2000

OTHER PUBLICATIONS

A.J. Dekker and W. Ch. Van Geel, Philips Research Report 2, 312 (1947).
A. Dekker and A. Middelhoek, "Transport Numbers and the Structure of Porous Anodic Films on Aluminum," J. Electrochem. Soc., 117(4), 440 (1970).

* cited by examiner

Primary Examiner—Son T. Dinh
Assistant Examiner—Pho Luu
(74) Attorney, Agent, or Firm—Banner & Witcoff, Ltd.

(57) ABSTRACT

Edges of a slit and cut to length foil having a dielectric oxide film on at least one surface are edge formed by edge forming the foil in an aqueous citrate electrolyte, preferably an aqueous ammonium citrate electrolyte, depolarizing the foil, and then edge forming the foil in an aqueous phosphate electrolyte, preferably an ammonium dihydrogen phosphate electrolyte. Using this formation process, a foil with excellent hydration resistance and capacitance is produced.

14 Claims, 2 Drawing Sheets

EDGE FORMATION PROCESS WITHOUT ANODIZING FOR ALUMINUM SOLID ELECTROLYTIC CAPACITOR

FIELD OF THE INVENTION

This invention relates to an edge formation process for aluminum solid electrolytic capacitors.

BACKGROUND OF THE INVENTION

Electrolytic capacitors with excellent high frequency characteristics are in high demand due to speed requirements of circuits for devices such as computers and wireless communications. In addition, high capacitance is required in the low voltage circuits that are used in these devices. Conductive polymers such as polypyrrole, polyaniline, polythiophene, and their derivatives, are finding increasing use as cathodes for electrolytic capacitors because such polymers have much higher conductivity than the liquid electrolytes and manganese dioxide cathodes currently used in these capacitors.

A wet electrolytic capacitor has an anode metal, a dielectric, a liquid electrolyte, and a cathode. Valve metals such as tantalum, aluminum, and niobium are particularly suited for the manufacture of high surface area electrolytic capacitors. The valve metal serves as the anode, and an oxide of the valve metal, coated by electrochemical oxidation of the valve metal surfaces, serves as the dielectric. The process of electrochemically coating a valve metal with a dielectric oxide is called formation. In order to maximize the dielectric surface area, and hence increase the volumetric efficiency of the capacitor, the valve metal substrates are porous bodies. These porous bodies can take the form of etched foils or slugs of compressed powder. The liquid electrolyte is impregnated into the porous body. A high surface area cathode completes the circuit. Etched aluminum foil is a particularly preferred anode material for wet electrolytic capacitors.

In the manufacture of wet aluminum electrolytic capacitors, the aluminum foil is etched to high surface area, coated with a dielectric oxide film, slit to the proper width, and then cut to length. During the slitting and cutting-to-length operations, the dielectric oxide on the edges of the foil is damaged and bare aluminum is exposed. The foil is then wound, placed in a can (along with the cathode), and filled with a non-aqueous fill electrolyte. The non-aqueous fill electrolyte is composed of, for example, borates in non-aqueous solvents containing a very small amount of water. After filling with electrolyte, the cans are sealed to prevent electrolyte from escaping and to keep additional water out.

A critical part of conditioning a wet aluminum electrolytic capacitor is repairing the damage to the dielectric oxide on the edges of the slit and cut-to-length foil and any damage to the dielectric oxide on the face of the foil that incurred during the winding operation. If these edges are not re-formed, the capacitor will have a high leakage current. The non-aqueous fill electrolytes, containing a very small amount of water, are very efficient in re-forming oxide on the edges.

In the manufacture of a solid aluminum electrolytic capacitor with a conductive polymer cathode, the foil etching, forming, and slitting are done in a similar manner to that of wet aluminum electrolytic capacitor. However, the conductive polymer is not efficient at re-forming a dielectric film on the slit and cut edges and at repairing damaged oxide on the face. Therefore, this must be done in a separate step before the conductive polymer is impregnated into the aluminum/aluminum oxide anode.

Re-forming the slit and cut edges can be accomplished by immersing the elements in a formation bath or a series of formation baths. The requirements for these edge formation baths are threefold: 1) They must form a high quality dielectric oxide on the cut edges, 2) They must repair any damage to the dielectric oxide on the face of the element that was damaged during the slitting and cutting to length operation, and 3) They must not damage the dielectric oxide already on the face of the element. In addition, the formed dielectric oxide needs to have excellent hydration resistance.

Hydration resistance is critical for aluminum solid electrolytic capacitors with conductive polymer cathodes. After impregnation with the conductive polymer, the capacitors are washed extensively in water to remove excess reactants and reactant byproducts. This washing is at elevated temperature (>50° C.). The aluminum oxide film is exposed to conditions very conducive to hydration during this washing process, and, therefore, the aluminum oxide film must have a high degree of hydration resistance. Hydration of the oxide during the washing process, or on subsequent storage after washing, can result in hydrated oxide in the weld zone and this hydrated oxide is difficult or impossible to weld through to make a good attachment to the lead frame.

A high degree of hydration resistance is also required during storage or use of capacitors in high humidity environments. If the oxide becomes hydrated during use, the capacitor leakage current will increase, or the capacitor can become a short circuit.

It was discovered that prior art electrolytes have deficiencies when used for edge formation of aluminum anodes intended for use in solid aluminum electrolytic capacitors with conductive polymer cathodes. The fill electrolytes used in wet aluminum capacitors are not suitable for use outside a sealed can because of their toxic nature and their propensity to adsorb water from the air. Thus they cannot be used in open, mass production electrolyte baths.

Electrolytes used for the production of the original aluminum oxide film are also not completely suitable because they are designed to form oxide on a freshly etched surface or a hydrated oxide surface and not designed to form oxide on cut edges and to repair oxide on the face (cf. U.S. Pat. Nos. 3,796,644; 4,113,579; 4,159,927; 4,481,084; 4,537,665; 4,715,936). In addition, compromises must be made in the selection of an electrolyte because of the high current efficiency needed to economically produce a dielectric oxide over the entire etched aluminum surface.

Slitting and cutting the foil to length mechanically damages the edges and this mechanical damage should be repaired before or during the formation of the dielectric oxide film on the edge.

Several electrolyte systems have been considered for the edge formation of aluminum electrolytic capacitors with a solid conductive polymer cathode. Low leakage current and high capacitance can be achieved by producing a thick, porous layer on the edge using aqueous solutions of oxalic acid, followed by forming a barrier layer with aqueous solutions of ammonium adipate (EP 1,028,441 A1). A flowchart of this prior art edge formation process is shown in FIG. 2. The parts are first anodized in oxalic acid, rinsed, and dried. This produces a thick, porous layer on the edge. Since oxalic acid has a low pH, it also tends to remove the very outer layers of oxide from the surface. The parts are then formed in ammonium adipate, rinsed, and dried. This step produces a dielectric oxide on the edge. This is followed by a depolarization step and another formation in ammonium adipate, rinse, and dry. The resulting films are unstable toward hydration. The hydration resistance of the pre-existing dielectric oxide is impaired because of the attack by oxalic acid. Neither ammonium adipate alone or the oxalic acid-ammonium adipate system are capable of forming a hydration resistant oxide on the edges. This leads to problems with leakage current instability in production, welding of the capacitors to the lead frame, and long-term stability towards hydration. It is desirable to have an edge formation electrolyte system, which provides a product with a hydration resistant oxide.

BRIEF SUMMARY OF THE INVENTION

It was discovered that edge formation in an aqueous citrate solution followed by formation in an aqueous phosphate solution imparts high hydration resistance to the foil and results in a minimal loss of capacitance.

The invention is directed to a process for edge forming a slit and cut-to-length foil having a dielectric oxide film on at least one surface comprising forming the foil in an aqueous citrate electrolyte, preferably an aqueous ammonium citrate electrolyte, depolarizing the foil, and forming the foil in an aqueous phosphate electrolyte, preferably an ammonium dihydrogen phosphate electrolyte. Using this formation process, a foil with excellent hydration resistance and capacitance is produced.

The invention is further directed to a process for edge forming a slit and cut-to-length aluminum foil having a dielectric oxide film on at least one surface comprising forming the foil in an aqueous ammonium citrate electrolyte, then depolarizing the foil, and then forming the foil in an aqueous ammonium dihydrogen phosphate electrolyte wherein the foil is not anodized in an aqueous acid electrolyte prior to forming the foil in an aqueous ammonium citrate electrolyte.

DETAILED DESCRIPTION OF THE INVENTION

Aluminum is etched to a high surface area and formed with a dielectric oxide and then slit to a width suitable for the production of solid electrolytic capacitors. The foil is then cut to length and welded to a carrier bar. A masking material is applied to the foil to define the area that will be subsequently edge formed.

Figure 1:
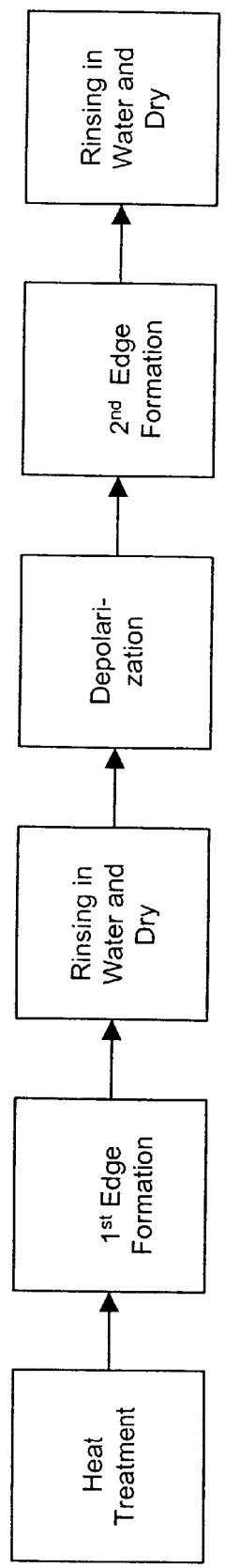
FIG. 1 shows a flowchart of the process of edge formation according to the invention.

A flowchart of the edge formation process is shown in FIG. 1. The foils are heat treated in an oven at elevated temperature to reduce the amount of surface hydration and to bring the foil surface to a well-defined state of wettablity. The elevated temperature is generally from about 250° C. to about 550° C. and the foils are heat treated from about 2 minutes to about 12 hours. Preferably the foils are heat treated at a temperature from about 300 to about 350° C. for about 15 to 30 minutes.

The foils are first edge formed in an aqueous citrate electrolyte ($1^{st}$ edge formation). The citrates can be soluble citrates salts of alkali metal, amine, or ammonium cations. Preferably, the electrolyte is ammonium citrate with a pH in the range of about 4 to about 9, preferably in the range of about 5 to about 7. The concentration of the citrate in water is from about 0.1 wt % to about 10 wt %, preferably about 0.5 wt % to about 5 wt %, more preferably about 1 wt %. The temperature of the electrolyte is from about 0° C. to about 90° C., preferably from about 50° C. to about 90° C., more preferably about 55° C. The time of formation depends on the concentration and temperature and is typically from about 3 minutes to about 20 minutes, preferably, about 10 minutes.

The foils are then rinsed of the aqueous citrate, dried to remove excess water, and depolarized. The depolarization step exposes any hydrate, trapped gas, or voids in the oxide produced during previous formation steps. The foils may be depolarized by heating the foils to an elevated temperature or by soaking on open circuit in a hot borate or citrate solution Preferably, the foils are depolarized by heating the foils to about 250° C. to about 550° C., for about 30 seconds to about 2 hours, preferably about 300° C. for 30 minutes.

The foils are then edge formed again in an aqueous phosphate electrolyte, preferably ammonium dihydrogen phosphate ($2^{nd}$ edge formation). The concentration of the phosphate in water is from about 0.01 wt % to about 5 wt %, preferably about 0.05 wt % to about 2 wt %, more preferably about 0.1 wt %. The temperature of the phosphate electrolyte is from about 0° C. to about 90° C., preferably about 25° C. to about 90° C., more preferably about 55° C. The time of formation depends on the temperature and concentration and is typically from about 3 minutes to about 20 minutes, preferably about 7 minutes. The phosphates can be soluble phosphate salts of alkali metal, amine, or ammonium cations. Preferably, the electrolyte is ammonium dihydrogen phosphate at a concentration of from about 0.01 wt % to about 5 wt %. Optionally, the phosphate electrolyte can contain glycerine to prevent any airline corrosion of the foil (Melody et al., US S/N).

After the formation in phosphate, the foils are given a final rinse in water and dried to remove excess water.

EXAMPLE 1

Etched foil with a formed layer such that the withstanding voltage was 13 V (capacitance ~119 $\mu F/cm^2$) was slit to a width of 3 mm. The foil was cut to a length of 11 mm and attached to stainless steel carrier bars. A polyimide masking material was applied to each of the foil elements on the carrier bar so that an area of 3 mm×6.1 mm was defined on each foil element.

Figure 2:
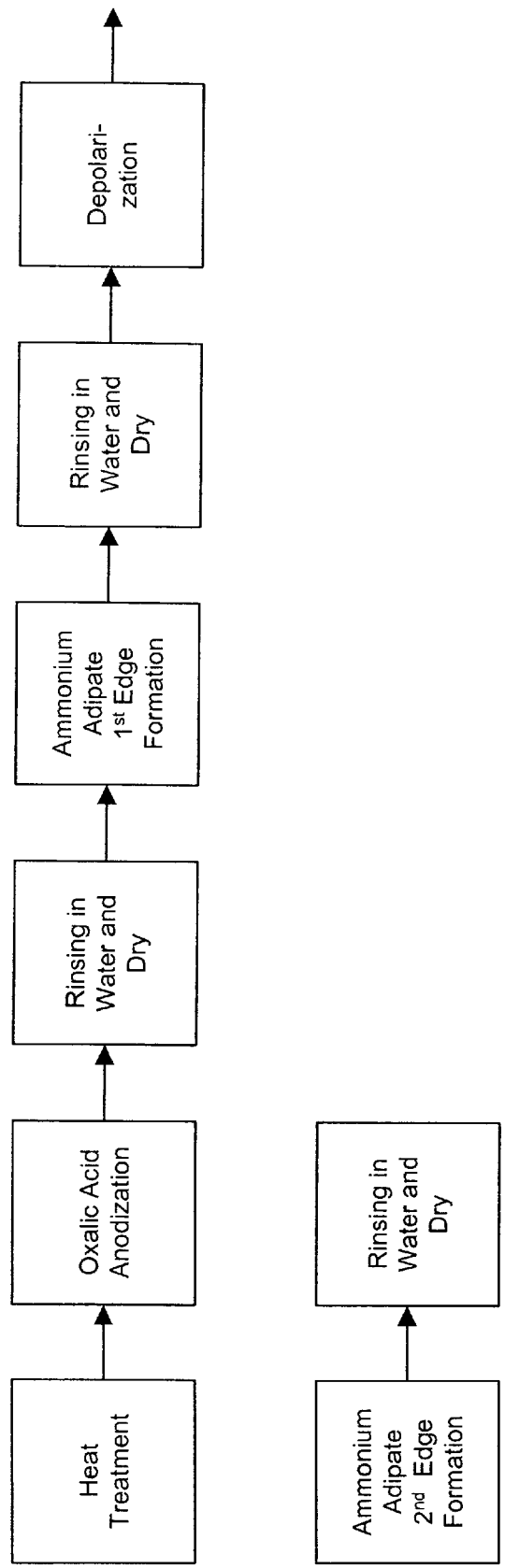
FIG. 2 shows a prior art edge formation process.

The carrier bars were divided into four groups. Each group was edge formed in the electrolytes shown in Table I. Group 1 was edge formed according to the process flow of FIG. 2. Groups 2, 3, and 4 were edge formed according to the process flow of FIG. 1. Each group was hydrated in deionized water for 90 minutes at 70° C. The foils were then reformed in 9% ammonium adipate (at 50° C.) for 24 minutes and the charge under the reformation curve was calculated from the measured current. The last column of Table I shows the calculated charge in millicoulombs per square cm of geometric surface area.

Group 1, anodized in oxalic acid followed edge formation in ammonium adipate, was severely discolored and had a large capacitance decrease (capacitance went from 17.7 to 3.2 $\mu F$/element) after the hydration test. A charge of >700 $mC/cm^2$ was passed during the reform after hydration. The color change is indicative of hydrated oxide formation. The large capacitance decrease occurs because of the formation of massive amounts of hydrated oxide, which plug the fine pores of the etched foil.

In contrast, Groups 2, 3, and 4, that had no oxalic acid anodization and were edge formed in ammonium citrate or ammonium dihydrogen phosphate, were not discolored, had little change in capacitance, and the charge passed during the reformation was ~50 to 100 times less than the case of oxalic acid/ammonium adipate formation.

TABLE I

| Anodization | 1st Edge Formation | 2nd Edge Formation | Reform Charge After Hydration mC/cm$^2$ |
|---|---|---|---|
| OA | AA | AA | 701 |
| None | AC | AC | 23.2 |
| None | AC | ADP | 10.7 |
| None | ADP | ADP | 5.87 |

OA = 5% oxalic acid (Room temperature)
AA = 9% ammonium adipate (50° C.)
AC = 1% dibasic ammonium citrate (55° C.)
ADP = 0.1% ammonium dihydrogen phosphate (55° C.)

EXAMPLE 2

Three batches of multi-layer aluminum capacitors with a conductive polymer cathode were fabricated. Aluminum foil was etched, formed to a withstanding voltage of 13 volts, and slit to 3 mm in width. The foil was then cut into 11 mm lengths and attached to carrier bars. A masking line was applied to the foil. Each batch was then divided into two groups. One group was edge formed in ammonium dihydrogen phosphate using the process flow in FIG. 1. The other group was anodized in the prior art electrolyte system of oxalic acid followed by edge formation in ammonium adipate using the process flow in FIG. 2.

A second masking line was applied. A conductive polymer layer of poly (3,4-ethylenedioxythiophene) was applied by chemical polymerization using techniques known to those skilled in the art (U.S. Pat. No. 4,910,645, Jonas et al.). The capacitors were then rinsed of polymerization byproducts and carbon and silver paste layers were applied. The capacitor elements were cut off the carrier bar. The cathode end of the capacitors were attached to the lead frame with a silver adhesive and the positive ends were welded to the lead frame by conventional resistance welding techniques. Four capacitors were attached to each lead frame to make a 4-layer device. The capacitors were then encapsulated in an epoxy case by transfer molding.

Table II shows the capacitance of the devices after molding. The capacitance of the hydration resistant formation system of ADP was 9% less than the prior art system using oxalic acid anodization followed by edge formation in ammonium adipate. This is disadvantageous as high capacitance in a given package volume is desired.

TABLE II

| Anodization | 1st Edge Formation | 2nd Edge Formation | Capacitance ($\mu$F) |
|---|---|---|---|
| None | ADP | ADP | 48.15 |
| OA | AA | AA | 52.85 |

EXAMPLE 3

Two batches of capacitors were fabricated in a similar manner to Example 2. One half of each batch was edge formed in AC electrolyte using the process flow in FIG. 1. The other half of each batch was anodized in the prior art electrolyte system of OA followed by edge formation in AA using the process flow in FIG. 2. The average capacitance of the two batches is shown in Table III. In this case, the capacitance was only 3.6% less than for the OA and AA system.

TABLE III

| Anodization | 1st Edge Formation | 2nd Edge Formation | Capacitance ($\mu$F) |
|---|---|---|---|
| None | AC | AC | 52.34 |
| OA | AA | AA | 54.32 |

EXAMPLE 4

Five batches of capacitors were fabricated in a similar manner to Example 2. One half of each batch was edge formed in AC electrolyte followed by ADP electrolyte using the process in FIG. 1. The other half of each batch was anodized in the prior art electrolyte system of OA followed by edge formation in AA using the process flow in FIG. 2. The average capacitance of the five batches is shown in Table IV. The capacitance for the AC/ADP edge formation system was 4% less than for the OA/AA system. This is similar to the capacitance difference in Example 3, but, as shown in Example 1, the hydration resistance of the AC/ADP system is better than the AC/AC system.

The capacitors were further tested by exposing them to a temperature of 85° C. and a relative humidity of 85% for 168 hours. After exposure, the leakage current of the group processed in ammonium citrate and ammonium dihydrogen phosphate was less than half that of the group processed in the prior art system of oxalic acid and ammonium adipate.

TABLE IV

| Anodization | 1st Edge Formation | 2nd Edge Formation | Capacitance ($\mu$F) | Leakage Current After 168 hrs. 85 C/85% RH ($\mu$A) |
|---|---|---|---|---|
| None | AC | ADP | 51.48 | 5.0 |
| OA | AA | AA | 53.65 | 12.0 |

Thus, the edge formation electrolyte system of ammonium citrate followed by ammonium dihydrogen phosphate gives the best combination of capacitance and hydration resistance.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A process for edge forming a foil having a dielectric oxide film on at least one surface and slit and cut-to-length comprising edge forming the foil in an aqueous citrate electrolyte, then depolarizing the foil, and then edge forming the foil in an aqueous phosphate electrolyte wherein the foil is not anodized in an aqueous acid electrolyte prior to forming the foil in an aqueous citrate electrolyte.

2. The process according to claim 1 wherein the foil is aluminum.

3. The process according to claim 1 wherein, prior to forming the foil in the aqueous citrate electrolyte, the foils are heat-treated.

4. The process according to claim 3 wherein the foils are heat-treated at a temperature of from about 250° C. to about 550° C. for about 2 minutes to about 12 hours.

5. The process according to claim 4 wherein the foils are heat-treated at a temperature from about 300° C. to about 350° C. for about 15 to about 30 minutes.

6. The process according to claim 1 wherein the citrate is ammonium citrate.

7. The process according to claim 1 wherein the concentration of citrate in the aqueous citrate electrolyte is from about 0.1 to about 10%.

8. The process according to claim 1 wherein the temperature of the aqueous citrate electrolyte is from about 0 C. to about 90° C.

9. The process according to claim 1 wherein the concentration of phosphate in the aqueous phosphate electrolyte is from about 0.1 to about 10%.

10. The process according to claim 1 wherein the temperature of the aqueous phosphate electrolyte is from about 0 C. to about 90° C.

11. The process according to claim 1 wherein the phosphate is ammonium dihydrogen phosphate.

12. The process according to claim 11 wherein the concentration of the ammonium dihydrogen phosphate in the aqueous phosphate electrolyte is about 0.01% to about 5%.

13. The process according to claim 1 wherein the aqueous phosphate electrolyte further comprises glycerine in an amount to prevent airline corrosion of the foil.

14. A process for edge forming an aluminum foil having a dielectric oxide film on at least one surface and slit and cut-to-length comprising edge forming the foil in an aqueous ammonium citrate electrolyte, then depolarizing the foil, and then edge forming the foil in an aqueous ammonium dihydrogen phosphate electrolyte wherein the foil is not anodized in an aqueous acid electrolyte prior to forming the foil in an aqueous ammonium citrate electrolyte.

* * * * *